US012586414B2

(12) United States Patent
Choo et al.

(10) Patent No.: US 12,586,414 B2
(45) Date of Patent: Mar. 24, 2026

(54) METHOD, SYSTEM, AND NON-TRANSITORY COMPUTER-READABLE RECORDING MEDIUM, FOR MONITORING OBJECT

(71) Applicant: Bodit Inc., Gunpo (KR)

(72) Inventors: Kwang Jae Choo, Gunpo (KR); Min Yong Shin, Suwon (KR); Heung Jong Yoo, Seoul (KR); Yoon Chul Choi, Anyang (KR); Seongjin Kim, Icheon (KR); Nayeon Kim, Icheon (KR)

(73) Assignee: Bodit Inc., Gunpo (KR)

( * ) Notice: Subject to any disclaimer, the term of this patent is extended or adjusted under 35 U.S.C. 154(b) by 362 days.

(21) Appl. No.: 18/340,219

(22) Filed: Jun. 23, 2023

(65) Prior Publication Data

US 2024/0005700 A1 Jan. 4, 2024

Related U.S. Application Data

(63) Continuation of application No. PCT/KR2021/011185, filed on Aug. 23, 2021.

(30) Foreign Application Priority Data

Dec. 24, 2020 (KR) ........................ 10-2020-0182970

(51) Int. Cl.
*G06V 40/20* (2022.01)

(52) U.S. Cl.
CPC .................................... *G06V 40/20* (2022.01)

(58) Field of Classification Search
None
See application file for complete search history.

(56) References Cited

U.S. PATENT DOCUMENTS

| | | | |
|---|---|---|---|
| 2014/0072206 A1 | 3/2014 | Eaton et al. | |
| 2015/0052093 A1* | 2/2015 | Canoy ...................... | G06N 3/08 706/25 |

(Continued)

FOREIGN PATENT DOCUMENTS

| | | |
|---|---|---|
| JP | 2019122368 A | 7/2019 |
| KR | 101599860 B1 | 3/2016 |

(Continued)

OTHER PUBLICATIONS

Lago, Paula, et al. "Representing and learning human behavior patterns with contextual variability." International Conference on Database and Expert Systems Applications. Cham: Springer International Publishing, 2017. (Year: 2017).*

(Continued)

*Primary Examiner* — Michelle M Entezari Hausmann
(74) *Attorney, Agent, or Firm* — Dinsmore & Shohl LLP; Yongsok Choi, Esq.

(57) ABSTRACT

A method for monitoring an object is provided. The method includes the steps of: specifying, from sensor data measured by a sensor for at least one object, pattern data on an unidentified behavior of the at least one object that is not recognized by a machine learning-based behavior recognition model; and determining at least a part of the pattern data as target data on the basis of at least one of a measurement frequency and a measurement magnitude of the pattern data, and providing information on the target data to a user.

3 Claims, 1 Drawing Sheet

(56) References Cited

U.S. PATENT DOCUMENTS

| | | | |
|---|---|---|---|
| 2018/0018588 A1* | 1/2018 | Dalton | G06Q 10/067 |
| 2019/0087965 A1 | 3/2019 | Datta et al. | |
| 2023/0052903 A1* | 2/2023 | Mazumder | G06Q 10/107 |

FOREIGN PATENT DOCUMENTS

| | | | |
|---|---|---|---|
| KR | 102019-0047683 A | 5/2019 | |
| KR | 1020190093798 A | 8/2019 | |
| KR | 102067157 B1 | 2/2020 | |

OTHER PUBLICATIONS

Cook, Diane J., and Narayanan C. Krishnan. Activity learning: discovering, recognizing, and predicting human behavior from sensor data. John Wiley & Sons, 2015. (Year: 2015).*

Li, Jian, Shaogang Gong, and Tao Xiang. "Learning behavioural context." International journal of computer vision 97.3 (2012): 276-304. (Year: 2012).*

Sumi, K. et al., "Framework of Cow Calving Monitoring System Using a Single Depth Camera", 2018 International Conference on Image and Vision Computing New Zealand (IVCNZ), IEEE, published 2018 < URL: https://ieeexplore.ieee.org/stamp/stamp.jsp?tp= &arnumber=8634738 >.

Fernandes, A.F. et al., "Image Analysis and Computer Vision Applications in Animal Sciences: An Overview", Frontiers in Veterinary Science (2020, vol. 7, Article 551269), published Oct. 21, 2020 < URL: https://www.frontiersin.org/journals/veterinary-science/ articles/10.3389/fvets.2020.551269/pdf?isPublishedV2=false >.

* cited by examiner

200

METHOD, SYSTEM, AND NON-TRANSITORY COMPUTER-READABLE RECORDING MEDIUM, FOR MONITORING OBJECT

CROSS-REFERENCE TO RELATED APPLICATIONS

This application is a U.S. national phase continuation application of International Patent Application No. PCT/KR2021/011185, filed on Aug. 23, 2021, which claims priority to Korean Patent Application No. 10-2020-0182970, filed on Dec. 24, 2020. The disclosures of both of the International and Korean Patent Applications are hereby incorporated by reference in their entireties.

FIELD OF THE INVENTION

The present invention relates to a method, system, and non-transitory computer-readable recording medium for monitoring an object.

BACKGROUND

In recent years, there has been a lot of research on machine learning technology, and techniques have been introduced to efficiently monitor a specific object (e.g., a domestic animal such as a calf) using a machine learning-based behavior recognition model.

As an example of related conventional techniques, Korean Laid-Open Patent Publication No. 10-2020-0059445 discloses a technique comprising: a data collection step for collecting data from a sensor; a feature point generation step for analyzing the collected data to generate feature points; and a pattern analysis step for passing the feature points through a modeled classifier to detect a behavior pattern.

However, according to the techniques introduced so far as well as the above-described conventional technique, there is a problem that it is difficult to monitor, among behaviors of an object, a behavior that is not recognized by a machine learning-based behavior recognition model (e.g., an abnormal behavior of a calf such as falling or fainting).

In this connection, the inventor(s) present a technique for providing a user with information on a behavior not recognized by a machine learning-based behavior recognition model, thereby assisting in monitoring the behavior.

SUMMARY OF THE INVENTION

One object of the present invention is to solve all the above-described problems in prior art.

Another object of the invention is to specify, from sensor data measured by a sensor for at least one object, pattern data on an unidentified behavior of the at least one object that is not recognized by a machine learning-based behavior recognition model, and to determine at least a part of the pattern data as target data on the basis of at least one of a measurement frequency and a measurement magnitude of the pattern data, and provide information on the target data to a user.

Yet another object of the invention is to provide a user with information on a behavior not recognized by a machine learning-based behavior recognition model, thereby assisting in monitoring the behavior.

Still another object of the invention is to monitor a behavior not recognized by a machine learning-based behavior recognition model, thereby assisting in early detection of an anomaly of an object and facilitated management of the object.

The representative configurations of the invention to achieve the above objects are described below.

According to one aspect of the invention, there is provided a method comprising the steps of: specifying, from sensor data measured by a sensor for at least one object, pattern data on an unidentified behavior of the at least one object that is not recognized by a machine learning-based behavior recognition model; and determining at least a part of the pattern data as target data on the basis of at least one of a measurement frequency and a measurement magnitude of the pattern data, and providing information on the target data to a user.

According to another aspect of the invention, there is provided a system comprising: an object monitoring unit configured to specify, from sensor data measured by a sensor for at least one object, pattern data on an unidentified behavior of the at least one object that is not recognized by a machine learning-based behavior recognition model; and a target data management unit configured to determine at least a part of the pattern data as target data on the basis of at least one of a measurement frequency and a measurement magnitude of the pattern data, and provide information on the target data to a user.

In addition, there are further provided other methods and systems to implement the invention, as well as non-transitory computer-readable recording media having stored thereon computer programs for executing the methods.

According to the invention, it is possible to specify, from sensor data measured by a sensor for at least one object, pattern data on an unidentified behavior of the at least one object that is not recognized by a machine learning-based behavior recognition model, and to determine at least a part of the pattern data as target data on the basis of at least one of a measurement frequency and a measurement magnitude of the pattern data, and provide information on the target data to a user.

According to the invention, it is possible to provide a user with information on a behavior not recognized by a machine learning-based behavior recognition model, thereby assisting in monitoring the behavior.

According to the invention, it is possible to monitor a behavior not recognized by a machine learning-based behavior recognition model, thereby assisting in early detection of an anomaly of an object and facilitated management of the object.

DETAILED DESCRIPTION

Figure 1:
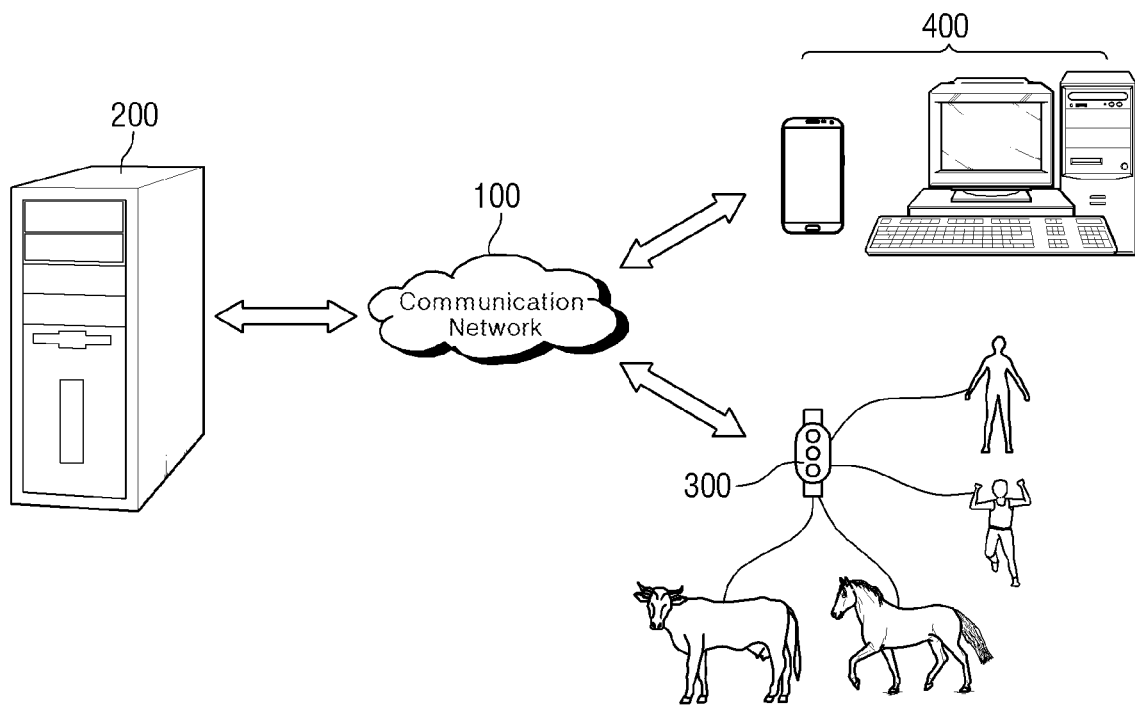
FIG. 1 schematically shows the configuration of an entire system for monitoring an object according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Although the descriptions of embodiments of the object monitoring system herein are focused on monitoring behaviors of a calf, it should be understood that the object monitoring system according to the invention may be applied to monitoring any other domestic animal such as a horse or pig, and may also be applied to monitoring behaviors of a person such as a patient.

Further, it should be understood that the behavior herein does not necessarily refer to an action of an object with movement, but may also refer to a state in which the object maintains a particular posture for a predetermined period of time without changing its posture (or with very little movement).

Configuration of the Entire System

FIG. 1 schematically shows the configuration of the entire system for monitoring an object according to one embodiment of the invention.

As shown in FIG. 1, the entire system according to one embodiment of the invention may comprise a communication network 100, an object monitoring system 200, a sensor 300, and a device 400.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as WiFi communication, WiFi-Direct communication, Long Term Evolution (LTE) communication, 5G communication, Bluetooth communication (including Bluetooth Low Energy (BLE) communication), infrared communication, and ultrasonic communication. As another example, the communication network 100 may be an optical communication network, at least a part of which may be implemented with a conventional communication scheme such as LiFi (Light Fidelity).

Meanwhile, the communication network 100 according to one embodiment of the invention may be constructed from two or more types of communication networks. For example, the communication network between the object monitoring system 200 and the device 400 may be a high-speed wireless communication network such as LTE communication or 5G communication, or may be a wired communication network, and the communication network between the object monitoring system 200 and the sensor 300 may be a low power wide area network (LPWAN) such as LoRaWAN, SIGFOX, LTE-MTC, or narrowband Internet of Things (NB-IoT).

However, the configuration of the communication network 100 according to one embodiment of the invention is not limited to the foregoing, and may be diversely changed as long as the objects of the invention may be achieved.

Next, the object monitoring system 200 according to one embodiment of the invention may function to: specify, from sensor data measured by a sensor for at least one object, pattern data on an unidentified behavior of the at least one object that is not recognized by a machine learning-based behavior recognition model; and determine at least a part of the pattern data as target data on the basis of at least one of a measurement frequency and a measurement magnitude of the pattern data, and provide information on the target data to a user.

The configuration and functions of the object monitoring system 200 according to the invention will be discussed in more detail below.

Next, the sensor 300 according to one embodiment of the invention is digital equipment capable of connecting to and then communicating with the object monitoring system 200, and may include a known six-axis angular velocity/acceleration sensor. Thus, the sensor 300 may measure acceleration and angular velocity (i.e., the rate of tilting in a certain direction) in the X-axis, Y-axis, and Z-axis. Further, angular acceleration may be measured together with or instead of the angular velocity. The sensor 300 may be worn on or inserted in a body part (e.g., a neck) of an object (e.g., a calf). However, the type of the sensor 300 according to one embodiment of the invention and the location where the sensor 300 is worn or inserted are not particularly limited, and may be diversely changed as long as the objects of the invention may be achieved. For example, the sensor 300 according to one embodiment of the invention may include a different type of sensor other than the angular velocity and acceleration sensor, and may be inserted inside a body of an object (e.g., a calf).

In particular, the sensor 300 according to one embodiment of the invention may include an application (not shown) for assisting a user to receive services such as object monitoring from the object monitoring system 200. The application may be downloaded from the object monitoring system 200 or an external application distribution server (not shown). Meanwhile, the characteristics of the application may be generally similar to those of an object monitoring unit 210, a target data management unit 220, a communication unit 230, and a control unit 240 of the object monitoring system 200 to be described below. Here, at least a part of the application may be replaced with a hardware device or a firmware device that may perform a substantially equal or equivalent function, as necessary.

Next, the device 400 according to one embodiment of the invention is digital equipment capable of connecting to and then communicating with the object monitoring system 200, and any type of digital equipment having a memory means and a microprocessor for computing capabilities, such as a smart phone, a tablet, a smart watch, a smart band, smart glasses, a desktop computer, a notebook computer, a workstation, a personal digital assistant (PDAs), a web pad, and a mobile phone, may be adopted as the device 400 according to the invention.

In particular, the device 400 may include an application (not shown) for assisting a user to receive services such as object monitoring from the object monitoring system 200. The application may be downloaded from the object monitoring system 200 or an external application distribution server (not shown). Meanwhile, the characteristics of the application may be generally similar to those of the object monitoring unit 210, the target data management unit 220, the communication unit 230, and the control unit 240 of the object monitoring system 200 to be described below. Here, at least a part of the application may be replaced with a hardware device or a firmware device that may perform a substantially equal or equivalent function, as necessary.

Configuration of the Object Monitoring System

Hereinafter, the internal configuration of the object monitoring system 200 crucial for implementing the invention and the functions of the respective components thereof will be discussed.

Figure 2:
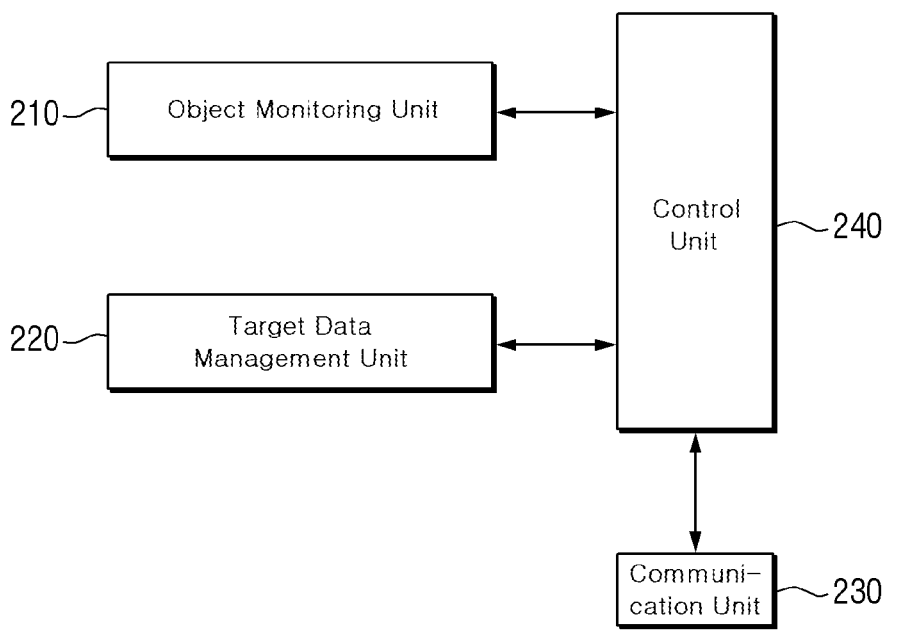
FIG. 2 specifically shows the internal configuration of an object monitoring system according to one embodiment of the invention.

FIG. 2 specifically shows the internal configuration of the object monitoring system 200 according to one embodiment of the invention.

As shown in FIG. 2, the object monitoring system 200 according to one embodiment of the invention may comprise an object monitoring unit 210, a target data management unit 220, a communication unit 230, and a control unit 240. According to one embodiment of the invention, at least some of the object monitoring unit 210, the target data management unit 220, the communication unit 230, and the control unit 240 may be program modules to communicate with an external system (not shown). The program modules may be included in the object monitoring system 200 in the form of operating systems, application program modules, or other program modules, while they may be physically stored in a variety of commonly known storage devices. Further, the program modules may also be stored in a remote storage device that may communicate with the object monitoring system 200. Meanwhile, such program modules may include, but are not limited to, routines, subroutines, programs, objects, components, data structures, and the like for performing specific tasks or executing specific abstract data types as will be described below in accordance with the invention.

Meanwhile, the above description is illustrative although the object monitoring system 200 has been described as above, and it will be apparent to those skilled in the art that at least a part of the components or functions of the object monitoring system 200 may be implemented in the sensor 300, the device 400, or a server (not shown) or included in an external system (not shown), as necessary.

First, the object monitoring unit 210 according to one embodiment of the invention may function to specify, from sensor data measured by a sensor for at least one object, pattern data on an unidentified behavior of the at least one object that is not recognized by a machine learning-based behavior recognition model.

Specifically, the sensor 300 according to one embodiment of the invention may measure sensor data from the at least one object. According to one embodiment of the invention, the sensor may be worn on or inserted in a body part of each of the at least one object, and the sensor data may include acceleration data and/or angular velocity data. The machine learning-based behavior recognition model according to one embodiment of the invention may recognize a behavior of each object on the basis of the sensor data measured as above. Here, according to one embodiment of the invention, the behavior recognition model may be implemented using a variety of known machine learning algorithms. For example, it may be implemented using an artificial neural network such as a convolutional neural network (CNN) or a recurrent neural network (RNN), but is not limited thereto.

Further, the object monitoring unit 210 according to one embodiment of the invention may specify, from the sensor data measured as above, pattern data on a behavior that is not recognized by the behavior recognition model, i.e., an unidentified behavior, among behaviors of the object. Here, according to one embodiment of the invention, the pattern data on the unidentified behavior does not necessarily refer to pattern data on a behavior that is not learned by the behavior recognition model, but may also refer to pattern data on a behavior that is learned but not recognized by the behavior recognition model (e.g., sensor data whose pattern or measurement magnitude is different from that of sensor data on a behavior learned by the behavior recognition model).

More specifically, the object monitoring unit 210 according to one embodiment of the invention may specify the pattern data on the unidentified behavior using a clustering algorithm such as k-means clustering, mean-shift clustering, or density-based spatial clustering of applications with noise (DBSCAN). For example, the object monitoring unit 210 according to one embodiment of the invention may cluster sensor data in a predetermined measurement window in a time domain (i.e., sensor data for a predetermined period of time) as one data unit, and specify data units that are clustered into a cluster other than a cluster of data units for a behavior of the object recognized by the behavior recognition model as the pattern data. According to one embodiment of the invention, the pattern data may refer to any one data unit, but may also refer to a plurality of data units clustered into the same cluster. Meanwhile, the clustering algorithm according to one embodiment of the invention is not limited to those listed above, and may be diversely changed as long as the objects of the invention may be achieved.

Meanwhile, the object monitoring unit 210 according to one embodiment of the invention does not necessarily specify the pattern data on the unidentified behavior from raw sensor data measured by the sensor for the object, but may preprocess the raw sensor data by, for example, removing noise from the raw sensor data or deriving specific data (e.g., the square root of the sum of the squares of acceleration values of respective axes included in acceleration data (i.e., gravity norm data)) from the raw sensor data (or from the raw data from which noise has been removed), and then specify the pattern data on the unidentified behavior from the preprocessed data (or from the raw sensor data with reference to the preprocessed data).

However, the manner of preprocessing the raw sensor data or specifying the pattern data on the unidentified behavior according to one embodiment of the invention is not limited to the foregoing, and may be diversely changed as long as the objects of the invention may be achieved.

Next, the target data management unit 220 according to one embodiment of the invention may function to determine at least a part of the pattern data on the unidentified behavior of the at least one object as target data on the basis of at least one of a measurement frequency and a measurement magnitude of the pattern data.

For example, when the pattern data on the unidentified behavior of the at least one object is specified by the object monitoring unit 210 according to one embodiment of the invention, the target data management unit 220 according to one embodiment of the invention may determine the pattern data as the target data if the frequency of the pattern data being included in a cluster including the pattern data for a predetermined period of time (i.e., the measurement frequency of the pattern data) is not less than a predetermined level.

As another example, when the pattern data on the unidentified behavior of the at least one object is specified by the object monitoring unit 210 according to one embodiment of the invention, the target data management unit 220 according to one embodiment of the invention may determine the pattern data as the target data if the measurement intensity and/or duration of the pattern data (i.e., the measurement magnitude of the pattern data) is not less than a predetermined level.

However, the manner of determining the target data according to one embodiment of the invention is not limited to the foregoing, and may be diversely changed as long as the objects of the invention may be achieved.

Meanwhile, the target data management unit 220 according to one embodiment of the invention may function to provide information on the determined target data to a user.

Specifically, according to one embodiment of the invention, the information on the target data may include temporal information (e.g., time of occurrence and duration) of the unidentified behavior of the at least one object corresponding to the target data, monitoring video information on the unidentified behavior, a measurement frequency of the unidentified behavior, a measurement magnitude of the unidentified behavior, and the like.

Further, according to one embodiment of the invention, the information on the target data may include context information on the unidentified behavior of the at least one object corresponding to the target data. According to one embodiment of the invention, the context information may include environmental information on the at least one object during the occurrence of the unidentified behavior, environmental information on the at least one object before and/or after the unidentified behavior, information on the behavior of the at least one object before and/or after the unidentified behavior, information on health status of the at least one object, information on management status of the at least one object, and the like.

For example, according to one embodiment of the invention, when the object to be monitored is a calf, the context information on the unidentified behavior of the calf may include environmental information on the calf (e.g., sound, temperature, and humidity) acquired from sensors installed in a cattle shed during the occurrence of the unidentified behavior, environmental information on the calf acquired from the sensors installed in the cattle shed before and/or after the unidentified behavior, information on the behavior of the calf before and/or after the unidentified behavior (e.g., the calf's behavior recognized by the machine learning-based behavior recognition model and/or the calf's milk sucking amount, feed intake, and activity level that may be estimated from the behavior), information on health status of the calf (e.g., presence or absence of certain diseases or symptoms), and information on management status of the calf (e.g., whether the calf is dehorned).

However, the context information on the unidentified behavior according to one embodiment of the invention is not limited to those listed above, and may be diversely changed as long as the objects of the invention may be achieved.

Further, the target data management unit 220 according to one embodiment of the invention may function to determine whether to train the machine learning-based behavior recognition model for the unidentified behavior, on the basis of feedback acquired from the user regarding the information on the target data.

Specifically, the target data management unit 220 according to one embodiment of the invention may provide the information on the target data to the user (e.g., a manager of the cattle shed), and acquire feedback from the user regarding the information on the target data. Then, the target data management unit 220 according to one embodiment of the invention may determine whether to train the machine learning-based behavior recognition model for the unidentified behavior of the at least one object corresponding to the target data, on the basis of the acquired feedback.

For example, when the object to be monitored is a calf, the target data management unit 220 according to one embodiment of the invention may provide monitoring video information on the unidentified behavior of the calf corresponding to the target data, context information on the unidentified behavior, and the like as the information on the target data to the manager of the cattle shed (i.e., the user) via the device 400. Then, when feedback is acquired from the manager that the unidentified behavior is related to the behavior of the calf falling down and the behavior needs to be monitored, the target data management unit 220 according to one embodiment of the invention may determine to train the machine learning-based behavior recognition model for the unidentified behavior. Then, the target data management unit 220 according to one embodiment of the invention may further train the behavior recognition model using the target data, the information on the target data, and the feedback acquired from the manager.

Meanwhile, the object monitoring unit 210 according to one embodiment of the invention may monitor the at least one object with respect to the unidentified behavior, using the behavior recognition model that is further trained for the unidentified behavior as above (i.e., the updated behavior recognition model).

Further, the object monitoring unit 210 according to one embodiment of the invention may deploy the behavior recognition model further trained for the unidentified behavior (i.e., the updated behavior recognition model) to the sensor for the at least one object, so that the at least one object may be monitored with respect to the unidentified behavior. Here, according to one embodiment of the invention, the updated behavior recognition model does not necessarily be deployed to all sensors, but may be selectively deployed to sensors for a particular group of objects.

Next, the communication unit 230 according to one embodiment of the invention may function to enable data transmission/reception from/to the object monitoring unit 210 and the target data management unit 220.

Lastly, the control unit 240 according to one embodiment of the invention may function to control data flow among the object monitoring unit 210, the target data management unit 220, and the communication unit 230. That is, the control unit 240 according to the invention may control data flow into/out of the object monitoring system 200 or data flow among the respective components of the object monitoring system 200, such that the object monitoring unit 210, the target data management unit 220, and the communication unit 230 may carry out their particular functions, respectively.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method performed in a system for monitoring an object, the system comprising one or more processors and the method comprising the steps of:

by the one or more processors, specifying, from sensor data measured by a sensor for at least one object, pattern data on an unidentified behavior among behaviors of the at least one object, wherein the unidentified behavior is a behavior that is not recognized by a machine learning-based behavior recognition model;

by the one or more processors, determining at least a part of the pattern data as target data on the basis of at least one of a measurement frequency and a measurement magnitude of the pattern data, wherein the measurement frequency is a frequency at which the pattern data appears in the sensor data measured for a predetermined period of time, and providing information on the target data to a user; and by the one or more processors, training the behavior recognition model for the unidentified behavior using the target data and the information on the target data, on the basis of feedback acquired from the user regarding the information on the target data, wherein in the specifying step, data units that are clustered into a cluster other than a cluster of data units for a behavior of the at least one object recognized by the behavior recognition model are specified as the pattern data on the unidentified behavior, using a clustering algorithm, wherein the information on the target data includes context information on the unidentified behavior, and wherein the context information includes environmental information on the at least one object acquired in relation to a period in which the unidentified behavior occurs, information on behaviors of the at least one object recognized in relation to the period in which the unidentified behavior occurs, information on health status of the at least one object, and information on management status of the at least one object.

2. A non-transitory computer-readable recording medium having stored thereon a computer program for executing the method of claim 1.

3. A system for monitoring an object, the system comprising one or more processors configured to:

specify, from sensor data measured by a sensor for at least one object, pattern data on an unidentified behavior among behaviors of the at least one object, wherein the unidentified behavior is a behavior that is not recognized by a machine learning-based behavior recognition model;

determine at least a part of the pattern data as target data on the basis of at least one of a measurement frequency and a measurement magnitude of the pattern data, wherein the measurement frequency is a frequency at which the pattern data appears in the sensor data measured for a predetermined period of time, and provide information on the target data to a user; and train the behavior recognition model for the unidentified behavior using the target data and information on the target data, on the basis of feedback acquired from the user regarding the information on the target data, wherein the one or more processors are configured to specify data units that are clustered into a cluster other than a cluster of data units for a behavior of the at least one object recognized by the behavior recognition model as the pattern data on the unidentified behavior, using a clustering algorithm, wherein the information on the target data includes context information on the unidentified behavior, and wherein the context information includes environmental information on the at least one object acquired in relation to a period in which the unidentified behavior occurs, information on behaviors of the at least one object recognized in relation to the period in which the unidentified behavior occurs, information on health status of the at least one object, and information on management status of the at least one object.

* * * * *